UNITED STATES PATENT OFFICE.

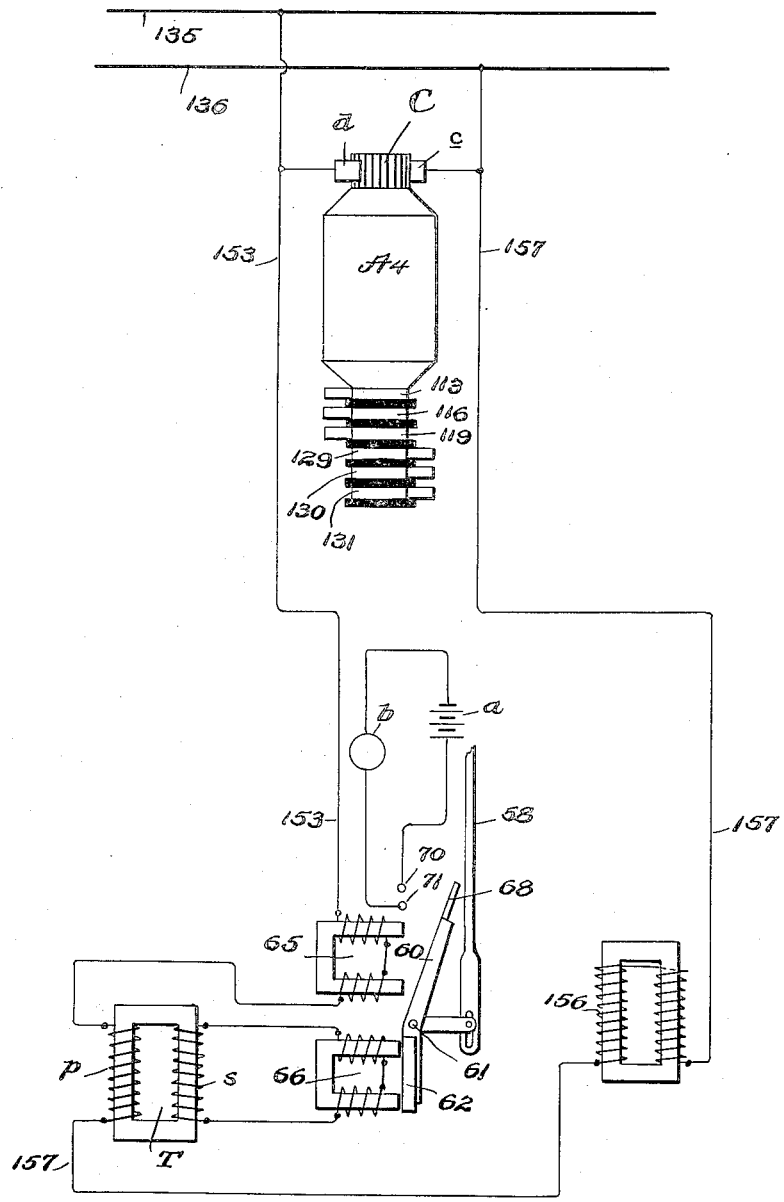

WILLIAM M. SCOTT, OF TREDYFFRIN TOWNSHIP, CHESTER COUNTY, PENNSYLVANIA.

ELECTROMAGNETIC APPARATUS.

1,283,329.

Specification of Letters Patent.

Patented Oct. 29, 1918.

Original application filed November 4, 1914, Serial No. 870,176. Divided and this application filed October 17, 1917. Serial No. 196,988.

*To all whom it may concern:*

Be it known that I, WILLIAM M. SCOTT, a citizen of the United States, residing in Tredyffrin township, in the county of Chester and State of Pennsylvania, have invented a new and useful Electromagnetic Apparatus, of which the following is a specification.

My invention relates to apparatus which differentiates between fluctuating or alternating currents of different frequencies, or between fluctuating or alternating current and continuous or direct current.

My invention resides in apparatus of the character referred to, which operates to effect any desired control or perform any desired function in response to a predetermined change in frequency of a fluctuating or alternating current and, more particularly, in response to change from fluctuating or alternating current to direct or continuous current, or vice versa.

My invention resides in apparatus of the character hereinafter described.

This application is a division from my application Serial Number 870,176, filed November 4, 1914, upon which issued Letters Patent No. 1,250,674, December 18, 1917.

For an illustration of one of various forms my invention may take, reference is to be had to the accompanying drawing.

The armature 60, of electro-magnet 65, is pivoted at 61; and the armature 62, of electro-magnet 66, is mechanically secured to or otherwise in suitable mechanical coöperation with the armature 60, the disposition of the armatures 60 and 62 being such that when the armature 62 is in its illustrated position close to the electro-magnet 66, armature 60 stands away from electro-magnet 65.

The winding of the electro-magnet 65 is connected in the circuit comprising the conductors 153 and 157 along with the primary *p* of the transformer T and with the inductance 156; and the winding of the electro-magnet 66 is connected in circuit with the secondary *s* of the transformer T.

The armature mechanism may be employed to perform any desired operation or function. In the example illustrated, the armature mechanism may actuate the contact 68 to engage and bridge the stationary contacts 70 and 71 and thereby close a circuit for any suitable purpose. In such circuit may be included a source of current *a* and any suitable translating device *b*.

Or the armature mechanism may be employed to perform a mechanical function, as for the purpose of moving the rod 58 for any purpose, for example, to actuate or control restraining means of electric switching mechanism, as described in my aforesaid application.

As an example of apparatus which will produce in the circuit comprising conductors 153 and 157 fluctuating or alternating current changing in frequency, or which will produce in that circuit a continuous or direct current, or a current without frequency, there is illustrated at $A^4$ the armature of a rotary converter which, as well understood in the art, converts alternating current into direct or continuous current by electro-dynamic action resulting from rotation of the armature with respect to field magnets, not shown. At 113, 116, 119, 121, 130 and 131 are idicated slip rings through which the alternating current is supplied to the armature $A^4$. At C is shown the direct current commutator, from which is delivered through the brushes *c* and *d* fluctuating or alternating current whose frequency is higher as the speed or rotation of the armature $A^4$ is lower, the frequency diminishing as the speed of the armature $A^4$ increases, and finally, when the armature is running at synchronous speed, the current delivered is direct or continuous, or one whose frequency is zero, such direct or continuous current being delivered to the consumption circuit comprising the supply conductors 135 and 136.

The operation is as follows:

When the armature $A^4$ is started from rest, there is delivered from the commutator C a fluctuating or alternating current having a frequency practically equal to the frequency of the alternating current supplied through slip rings to the armature $A^4$, and as the speed of the armature increases, as previously stated, the freqency of the current progressively diminishes until at synchronism direct or continuous current is delivered therefrom.

The electro-magnet 65 may itself have such inductance that at the higher frequency current flowing through its winding is so small that the resultant ampere turns are too few to effect attraction of the armature 60 toward the poles of the electro-magnet 65. But as the frequency of the current traversing the winding of the magnet 65 decreases, the current strength will increase, and finally, when the frequency is reduced to zero and there is therefore flowing through the magnet winding direct or continuous current, the ampere turns may be sufficient to cause attraction of armature 60, which then rotates in a counterclockwise direction upon its pivot 61 to cause contact 68 to engage contacts 70 and 71 to control the circuit including the translating device *b* and to raise the rod 58 to perform any suitable mechanical function.

The differentiation between currents of different frequencies effected as above described by the electro-magnet 65 by itself is ordinarily not of sufficient nicety or sharpness, and the differentiation may be made sharper or nicer by recourse to the inductance 156, such inductance, in addition to the inductance of winding of the electro-magnet 65 serving further to insure that armature 60 will not be attracted until the frequency has diminished to a suitably low value or has become zero, as in the case of direct or continuous current.

To even more sharply differentiate between currents of different frequencies or between alternating or fluctuating current and direct or continuous current, the additional electro-magnet 66 is provided in association with the transformer T. When the armature $A^4$ is at low speed and therefore the frequency of the current in the circuit is relatively high, the primary *p* of the transformer is also traversed by the alternating current, and by well known inductive action sets up in the secondary winding *s* an alternating current of like frequency, which traverses the winding of the electro-magnet 66, energizing the same, and causing it to hold the armature 62 attracted in opposition to the attractive force exerted upon the armature 60 by electro-magnet 65. However, as the frequency of the alternating current diminishes, the ratio of the volume of the secondary current to that of the primary current of the transformer progressively diminishes, with correspondingly diminishing opposition on the part of electro-magnet 66 to electro-magnet 65. And when eventually the frequency of the current becomes zero, that is, when direct or continuous current is flowing through the primary *p*, there is no current in the secondary circuit, and in consequence the opposition of electro-magnet 66 has been reduced to zero and the electro-magnet 65 is now able to attract its armature 60.

It will be understood that the transformer T with the associated holding magnet 66 may be employed as described, whether or not the inductance 156 be present; it is preferred, however, that inductance 156 shall be used also when the transformer T and magnet 66 are employed.

While in the foregoing description it has been assumed that response of the apparatus is to change in frequency in the direction of decrease of frequency, and that for such case the armature mechanism is normally in the position illustrated, it will be understood that the apparatus may normally be positioned in such manner that the armature 60 is close to the poles of the electro-magnet 65, while the armature 62 is separated from its magnet 66, in which case the apparatus will respond to a change from direct or continuous current to a fluctuating or alternating current or to a change from an alternating current frequency of one value to a higher frequency. In such latter case, as the current changes from direct to alternating or fluctuating, or as the frequency of the alternating or fluctuating current increases, the attractive force exerted by electro-magnet 65 will decrease, and that exerted by magnet 66 will increase, until at a predetermined frequency electro-magnet 66 will gain control and attract its armature to position corresponding with that illustrated. And such movement of the armature may then effect any suitable control by closing or opening any suitable circuit, such as that including the translating device *b*; or by actuating the rod 58 in suitable direction to perform any function or mechanical operation.

While it is preferred that the primary *p* of the transformer T shall be connected in series with the winding of the electro-magnet 65, it will be understood that said winding *p* may be connected in parallel with the winding of magnet 65. And while it is preferred that separate electro-magnets 65 and 66 be employed as described, it will be understood that both of the magnet windings may be placed upon one and the same core, namely, the core of magnet 65, and so connected in circuit that they normally oppose each other in their effect upon their core; and in such case the armature 62 may be omitted.

What I claim is:

1. Apparatus responsive to change in the frequency of an alternating or fluctuating current comprising an armature structure, magnet windings opposed to each other in their action upon said armature structure and one of which is traversed by the fluctuating or alternating current changing in frequency, a transformer whose primary winding is connected in circuit with said one of said magnet windings, and another of said magnet windings connected in the secondary circuit of said transformer.

2. Apparatus responsive to change in the frequency of an alternating or fluctuating current comprising an armature structure, magnet windings opposed to each other in their action upon said armature structure and one of which is traversed by the fluctuating or alternating current changing in frequency, an inductance in circuit with said one of said windings, a transformer whose primary winding is connected in circuit with one of said magnet windings, and another of said magnet windings connected in the secondary circuit of said transformer.

3. Apparatus responsive to change in frequency of fluctuating or alternating current comprising an electro-magnet and its armature, a winding of said electro-magnet traversed by the fluctuating or alternating current changing in frequency, a second electro-magnet and its armature, a connection between said armatures whereby their magnets oppose each other in their effect upon the armature structure, a transformer whose primary is connected in circuit with the winding of said first named electro-magnet, and a winding of said second named magnet connected in the secondary circuit of said transformer.

4. The combination with a circuit carrying fluctuating or alternating current, of an armature structure, magnet windings opposing each other in their effects upon said armature member, one of said windings connected in said circuit, a transformer whose primary winding is connected in said circuit in series with one of said windings, another of said magnet windings connected in the secondary circuit of said transformer, whereby upon change in frequency of said fluctuating or alternating current one of said magnet windings predominates over the other in effect upon said armature member.

5. The combination with a circuit and means for impressing thereon current interchanging in character between fluctuating or alternating and direct or continuous, of apparatus for differentiating between said currents comprising an armature structure, magnet windings opposed in their action upon said armature structure, one of said magnet windings connected in said circuit, and an inductive connection between another of said magnet windings and said circuit, whereby the current in said other of said magnet windings becomes substantially *nil* when said circuit is traversed by direct or continuous current.

6. The combination with a circuit and means for impressing thereon current interchanging in character between fluctuating or alternating and direct or continuous, of apparatus for differentiating between said currents comprising an armature structure, magnet windings opposed in their action upon said armature structure, one of said magnet windings connected in said circuit, a transformer whose primary is connected in said circuit, and another of said magnet windings connected in the secondary circuit of said transformer.

7. The combination with a circuit and means for impressing thereon current interchanging in character between fluctuating or alternating and direct or continuous, of apparatus for differentiating between said currents comprising an armature structure, magnet windings opposed in their action upon said armature structure, an inductance and one of said magnet windings connected in said circuit, and an inductive connection between another of said magnet windings and said circuit, whereby the current in said other of said magnet windings becomes substantially *nil* when said circuit is traversed by direct or continuous current.

8. The combination with a circuit and means for impressing thereon current changing in character from fluctuating or alternating to direct or continuous, of apparatus for responding to such change comprising a magnet, an armature therefor normally in unattracted position when the current in said circuit is fluctuating or alternating in character, the winding of said magnet connected in said circuit, and means for holding said armature in unattracted position comprising an armature mechanically connected to said first named armature, a magnet, a transformer whose primary winding is connected in said circuit, and the winding of said second named magnet connected in the secondary circuit of said transformer.

In testimony whereof I have hereunto affixed my signature this 16th day of October, 1917.

WILLIAM M. SCOTT.

In the presence of—
  NELLIE FIELD,
  ALICE S. MARSH.